(12) United States Patent
Reisser

(10) Patent No.: US 8,033,265 B2
(45) Date of Patent: Oct. 11, 2011

(54) ROTARY PISTON INTERNAL COMBUSTION ENGINE

(76) Inventor: Heinz-Gustav A. Reisser, Coshocton, OH (US)

( * ) Notice: Subject to any disclaimer, the term of this patent is extended or adjusted under 35 U.S.C. 154(b) by 465 days.

(21) Appl. No.: 12/197,522

(22) Filed: Aug. 25, 2008

(65) Prior Publication Data

US 2008/0314350 A1    Dec. 25, 2008

Related U.S. Application Data

(63) Continuation-in-part of application No. 11/304,608, filed on Dec. 16, 2005, now Pat. No. 7,415,962.

(51) Int. Cl.
*F02B 53/00*    (2006.01)
(52) U.S. Cl. ...... 123/245; 123/241; 123/18 R; 123/18 A
(58) Field of Classification Search ............... 123/241, 123/245, 18 R, 18 A
See application file for complete search history.

(56) References Cited

U.S. PATENT DOCUMENTS

| | | | |
|---|---|---|---|
| 1,095,034 A | 4/1914 | Sanchez et al. | |
| 1,348,675 A | 8/1920 | Weed | |
| 1,568,053 A | 1/1926 | Bullington | |
| 2,123,279 A * | 7/1938 | George et al. | 123/18 A |
| 2,124,327 A | 7/1938 | Wolstenholme | |
| 2,413,589 A | 12/1946 | Snyder | |
| 2,416,846 A | 3/1947 | Richter | |
| 3,258,618 A | 6/1966 | Spier | |
| 3,292,602 A | 12/1966 | Stewart | |
| 3,307,525 A | 3/1967 | McClure | |
| 3,396,632 A * | 8/1968 | LeBlanc | 123/245 |
| 3,580,228 A * | 5/1971 | Rocha et al. | 123/18 A |
| 3,645,239 A | 2/1972 | Cena | |
| 3,702,746 A | 11/1972 | Parmerlee | |
| 4,072,447 A | 2/1978 | Gaspar | |
| 4,370,109 A | 1/1983 | Sabet et al. | |
| 4,437,441 A * | 3/1984 | Menioux | 123/245 |
| 4,738,235 A | 4/1988 | Silvoza | |
| 5,996,538 A * | 12/1999 | Rocha et al. | 123/18 A |
| 6,036,461 A | 3/2000 | Bahniuk | |
| 6,164,263 A | 12/2000 | Saint-Hilaire et al. | |
| 6,321,693 B1 | 11/2001 | Kim et al. | |
| 6,691,647 B2 * | 2/2004 | Parker | 123/245 |
| 6,739,307 B2 | 5/2004 | Morgado | |
| 7,415,962 B2 * | 8/2008 | Reisser | 123/245 |
| 7,600,490 B2 * | 10/2009 | Reisser | 123/18 R |
| 2005/0016493 A1 | 1/2005 | Hoose | |
| 2007/0283922 A1 * | 12/2007 | Reisser | 123/245 |

FOREIGN PATENT DOCUMENTS

DE    4209444    9/1993

OTHER PUBLICATIONS

International Search Report—PCT/US2007/013115 (May 5, 2008).

\* cited by examiner

*Primary Examiner* — Mary A Davis
(74) *Attorney, Agent, or Firm* — Kegler Brown Hill & Ritter LPA; James J. Pingor

(57) ABSTRACT

An internal combustion engine, and more particularly a rotary internal combustion engine, is provided with said engine having multiple combustion chambers delimited by piston heads and an engine housing wall that defines at least a section of a torus. Additionally, a method for operating the internal combustion engine is described.

17 Claims, 16 Drawing Sheets

ROTARY PISTON INTERNAL COMBUSTION ENGINE

CROSS REFERENCE TO RELATED APPLICATION

This application is a continuation-in-part of U.S. application Ser. No. 11/304,608 filed Dec. 16, 2005 now U.S. Pat. No. 7,415,962, the entire contents of which are hereby incorporated by reference.

FIELD

The present disclosure relates to internal combustion engines, and more particularly rotary internal combustion engines.

BACKGROUND

The statements in this section merely provide background information related to the present disclosure and may not constitute prior art. In conventional combustion engines, the walls delimiting combustion chambers are of a cylindrical shape and closed on one end with a cylinder head. A piston is moveably guided through the other end into the cylinder. Internal combustion engines have 4 basic steps: (1) intake; (2) compression; (3) combustion and expansion; and (4) exhaust. During the intake step, combustible mixtures are injected into the combustion chamber. This mixture is placed under pressure by the compression of the piston into the cylinder. The mixture is then ignited and burnt. The hot combustion products ultimately expand; forcing the piston to move in the opposite direction and causing the transfer of energy to mechanical components that are coupled or connected to the piston, such as a crankshaft. The cooled combustion products are finally exhausted and the combustion cycle restarts. Typical combustion engines operate according to this principle may function in two cycles or four cycles, such as in Otto and diesel engines.

There exists a continuing issue related to the relatively low efficiency exhibited by conventional combustion engines. Engine efficiency is usually defined by comparing the theoretical chemical energy in the fuels against the useful energy abstracted from the fuels in the form of the kinetic energy transferred through the engine. Although the thermodynamic limit for abstracting energy from a typical fuel is about 37%, typical combustion engines exhibit an average efficiency of only about 20%.

Therefore, internal combustion engines that provide enhanced efficiency are continuously desired. It is further desirable that such an engine be more compact in size, lighter in weight, have a reduced need for internal lubrication, and be capable of being easily manufactured.

SUMMARY

The present disclosure provides an internal combustion engine to improve the efficiency, reduce the weight and size, and simplify the ability to manufacture such an engine. In one form of the present disclosure, the internal combustion engine has multiple rotary pistons that travel along a path of a partial torus.

In this form of the present disclosure, the internal combustion engine comprises a housing with a first wall that delimits a first combustion chamber and a second wall that delimits a second combustion chamber with the first and second walls each defining at least a section of a torus. The combustion chambers are further delimited by a first piston and a second piston with each piston having a torus shape and two piston heads. The ends of the walls that delimit the combustion chambers further act as guides for the piston heads located at the ends of the pistons.

The first combustion chamber is further delimited by a first piston head of a first piston. Similarly, the second combustion chamber is further delimited by a second piston head of the first piston. The first combustion chamber is still further delimited by the first piston head of a second piston; while the second combustion chamber is still further delimited by a second piston head of the second piston (35).

In another form of the present disclosure the first piston is shown to further comprise a first pivot arm that is coupled to a first connecting rod, and a second pivot arm that is coupled to a common pivot point. Similarly, the second piston further comprises a first pivot arm that is coupled to a second connecting rod, and a second pivot arm that is coupled to the common pivot point. The second pivot arms of each piston extend in a radial direction towards the center of the engine.

In yet another form of the present disclosure a first crankshaft is coupled to the first connecting rod, while a second crankshaft is coupled to the second connecting rod. The first crankshaft and the second crankshaft are located outside the cured path of the first piston and second piston as defined by the common pivot axis and the first and second walls that delimit the first and second combustion chambers, respectfully.

In general, the first and second pistons are guided along a curved path defined by the common pivot axis. The second pivot arm of the first piston and the second pivot arm of the second piston oscillate about the common pivot axis. The first and second pistons move simultaneously in opposite directions, thereby causing the piston heads to either expand or reduce the volume of the corresponding combustion chambers.

In yet another form of the present disclosure the second pivot arm is coupled to a guide frame via an engaging member. This guide frame has an open receiving area in which the engaging member and the common pivot axis are disposed. The guide frame is integrated with a guiding means that includes two parallel guide columns. The motion of the guide frame along the guide columns is transferred to the piston due to the connection of the second pivot arm to the guide frame via the engaging member. When the guide frame moves along the guide posts in one direction, the pistons travel along a circular path resulting in minimizing the volume of one combustion chamber and maximizing the volume of the other combustion chamber. Reversing the direction in which the guide frame moves results in the reverse effect.

In another form of the present disclosure, the motion of the guide frame along the guide columns is sustained by the presence of at least one oblong plate coupled to the common pivot point. The momentum established by the oblong plate is enough to sustain the oscillating movement of the piston along the curved path.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
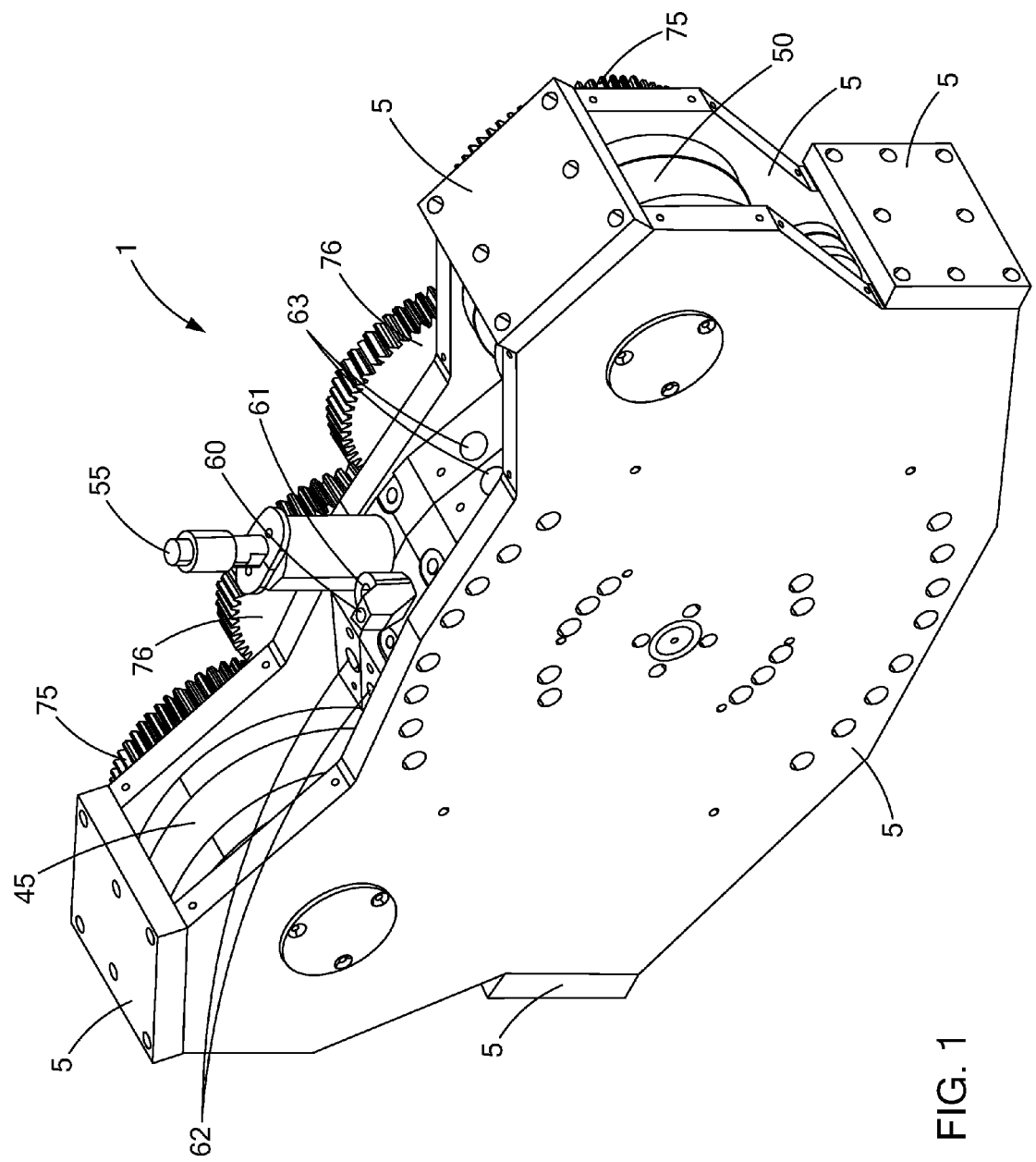
FIG. 1 is an isometric projection viewed from an anterior perspective of one form of the present disclosure representing an internal combustion engine constructed in accordance with the teachings of the present disclosure.

The following description is merely exemplary in nature and is in no way intended to limit the present disclosure or its application or uses. It should be understood that throughout the description and drawings, corresponding reference numerals indicate like or corresponding parts and features.

Figure 2:
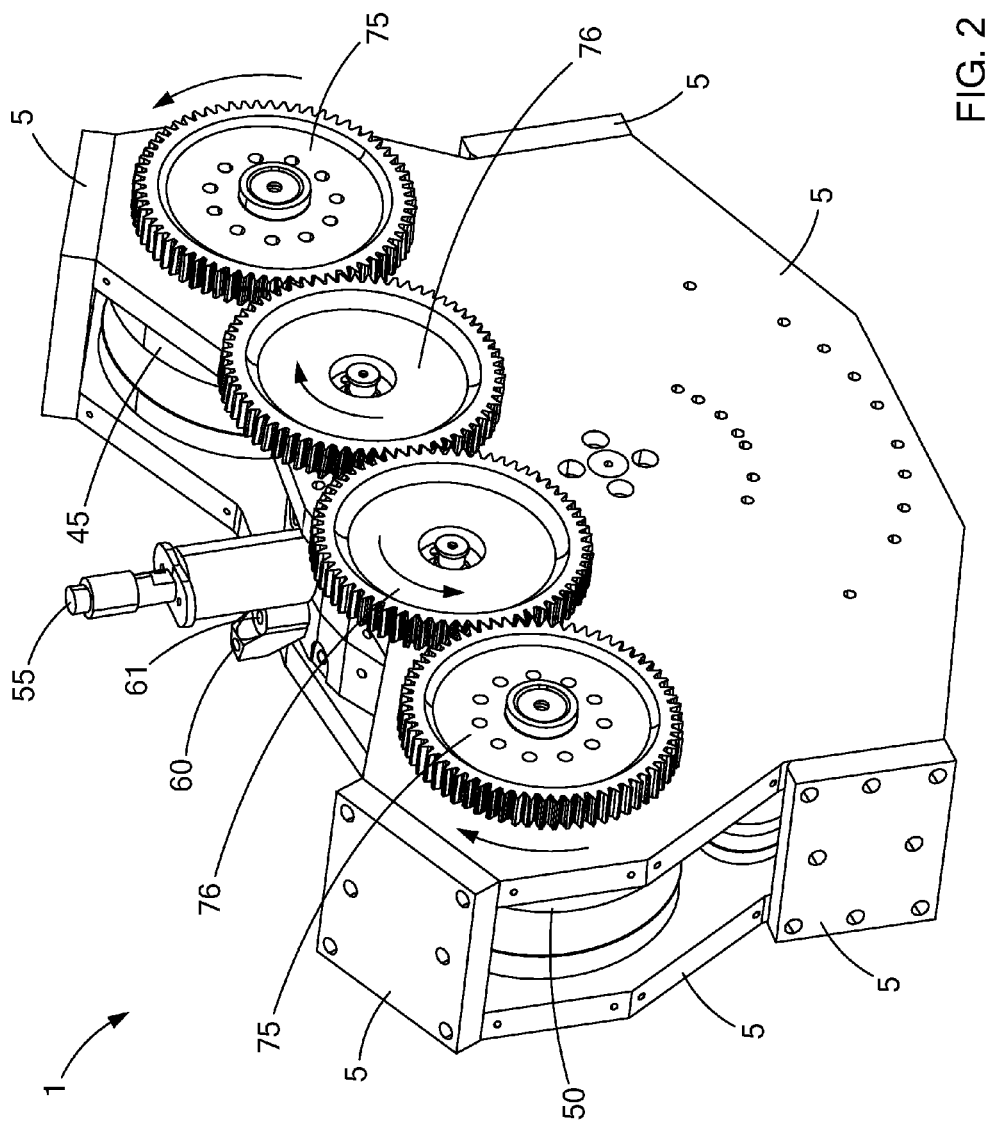
FIG. 2 is another isometric projection viewed from a posterior perspective of one form of the present disclosure representing an internal combustion engine constructed in accordance with the teachings of the present disclosure.

The present disclosure relates to an internal combustion engine, such as a two-cycle, a four-cycle, an Otto engine, and a diesel engine, among others. Referring to FIGS. 1 and 2, one form of the present disclosure relates to an internal combustion engine (1) having an engine housing (5) surrounding the components of said engine (1) including two crankshafts (45, 50). The engine housing (5) may be made in a single component or in multiple components that are fastened together. Each crankshaft (45, 50) may be coupled to at least one flywheel (75) with coupling to additional flywheels (76) being possible. The internal combustion engine can further comprise one or both of the following: an exhaust and intake valve train. The current embodiment does comprise a glow plug (61) and cylinder pressure mount (60) as well as an injection port (55). The engine in its displayed embodiment comprises an intake (62) and exhaust port (63) which make use of the scavenging process.

Figure 3:
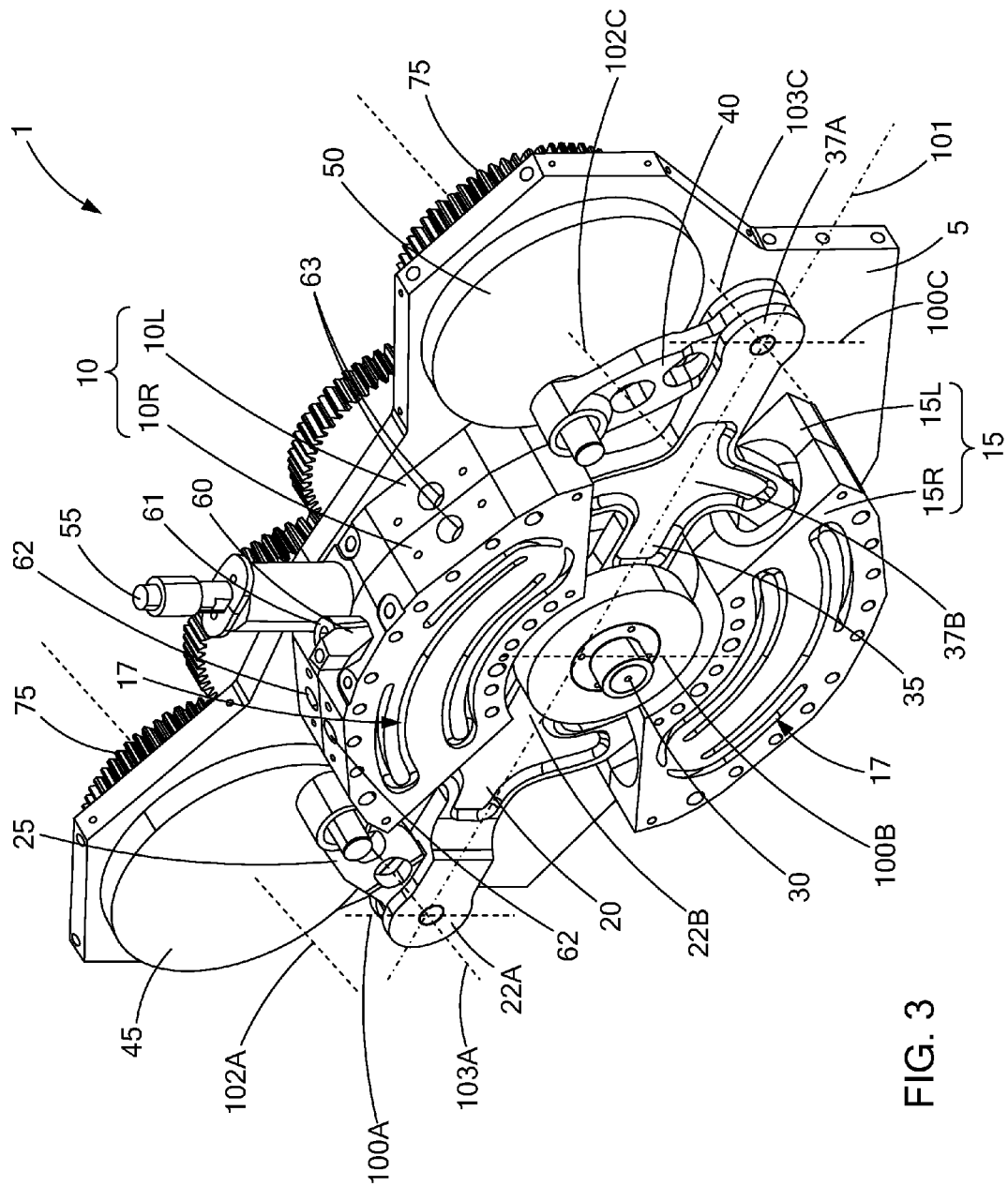
FIG. 3 is an isometric projection of one form of the present disclosure representing a perspective view of certain portions of an internal combustion engine constructed in accordance with the teachings of the present disclosure.
Figure 4:
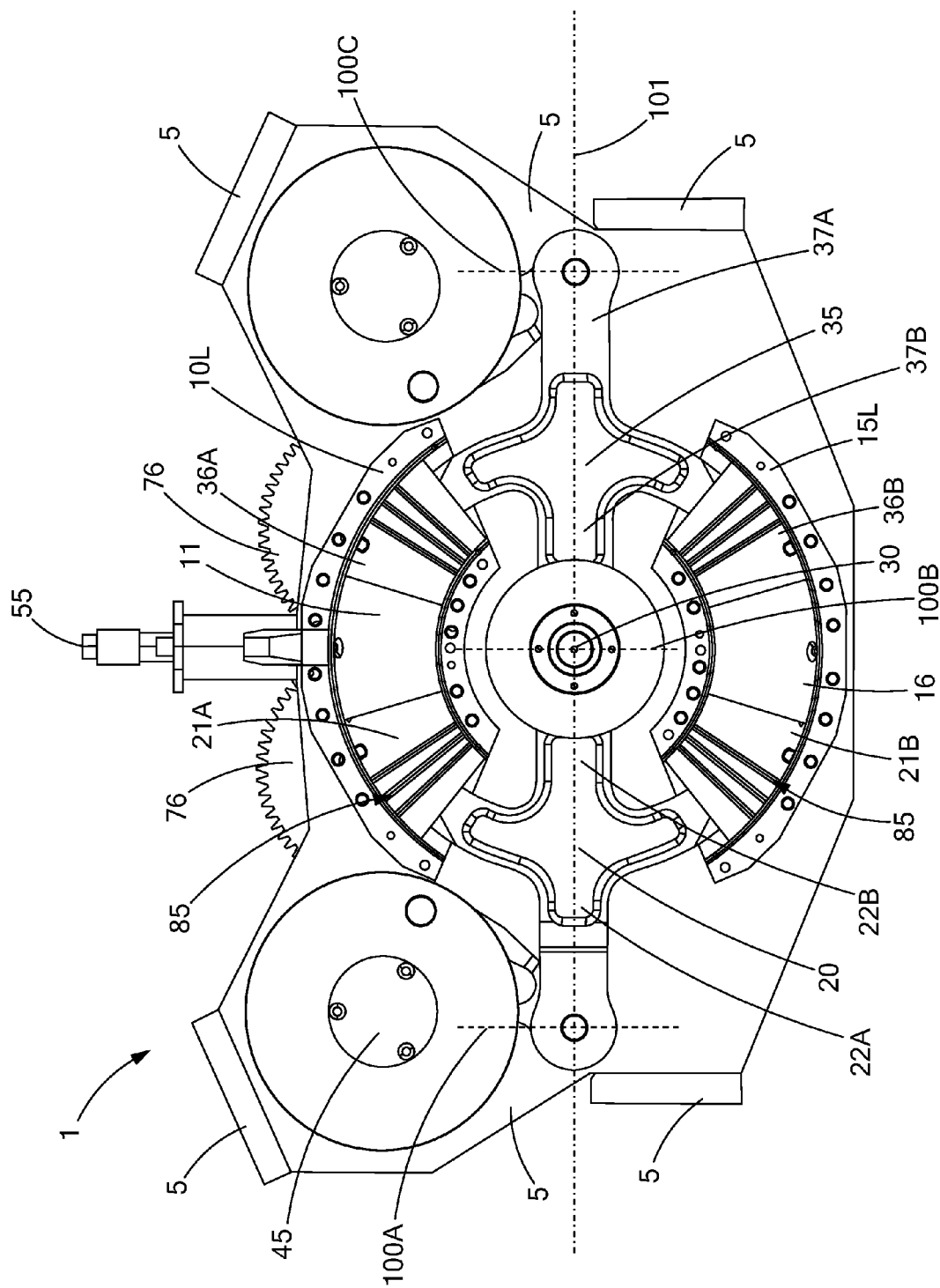
FIG. 4 is a cavalier projection of one form of the present disclosure representing a perspective view of certain portions of an internal combustion engine constructed in accordance with the teachings of the present disclosure.
Figure 5:
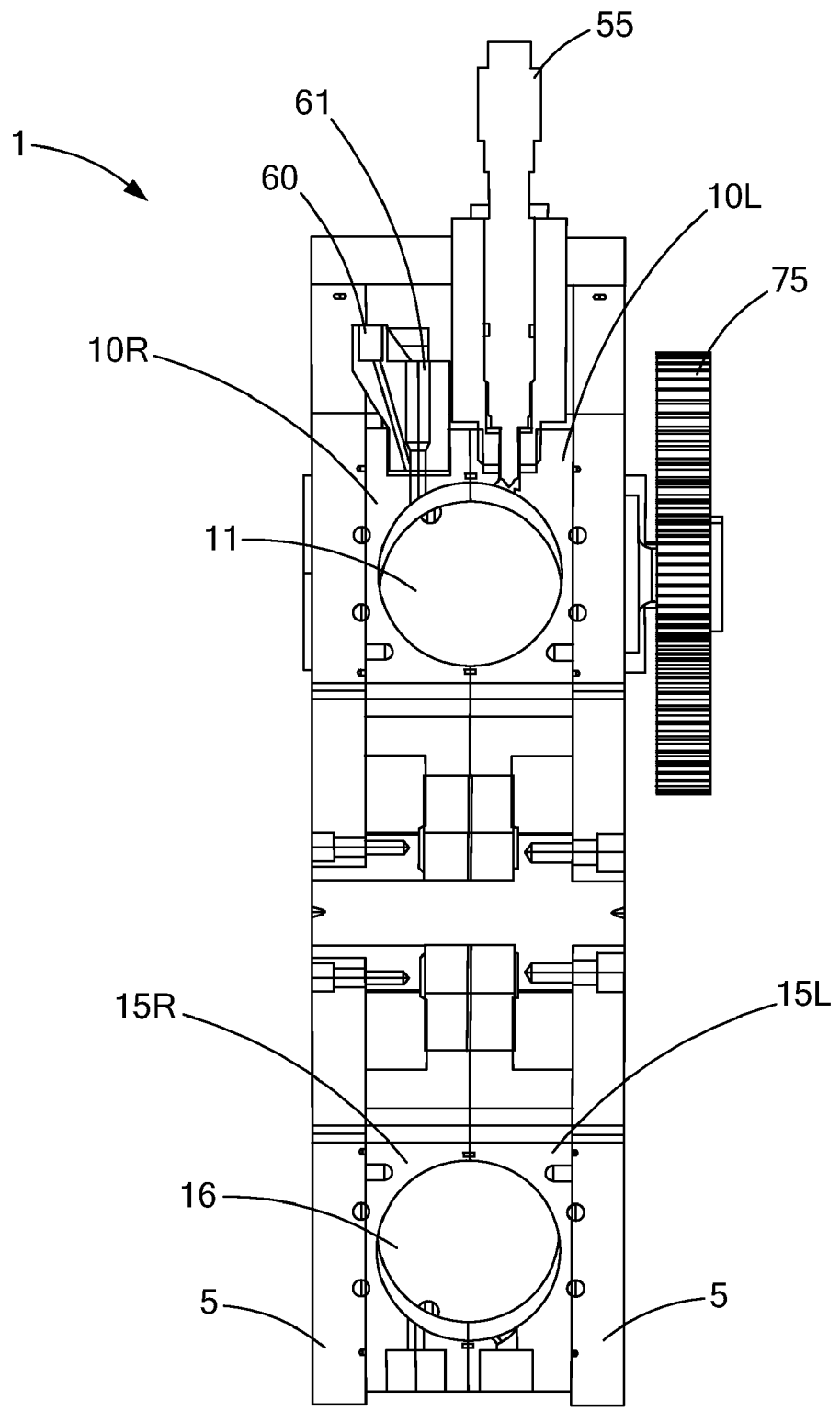
FIG. 5 is a cross-sectional view of one form of the present disclosure representing an internal combustion engine constructed in accordance with the teachings of the present disclosure.

Referring to FIGS. 3-6, one form of the present disclosure relates to an internal combustion engine (1) having an engine housing (5, partially shown) with a first wall (10) that delimits a first combustion chamber (11) and a second wall (15) that delimits a second combustion chamber (16) with the first (10) and second (15) walls each defining at least a section of a torus. It is understood that, within the scope of this disclosure, a torus means ring-shaped defined by a piston (20, 35) oscillating around a common pivot point (30). Although the cross-sectional shape of the piston head (21, 36) and combustion chamber (11, 16) are shown to be circular, it is possible that they may be another shape, such as but not limited to, a square, rectangle, or ellipse. The combustion chambers (11, 16) are further delimited by a first piston (20) and a second piston (35) with each piston having a torus shape and two piston heads (21, 36) as shown in FIGS. 4 and 6. The ends of the walls (10, 15) that delimit the combustion chambers (11, 16) further act as guides for the piston heads (21, 36) located at the ends of the pistons (20, 35).

In FIGS. 3, 4, and 6, the first piston (20) is shown to further comprise a first pivot arm (22A) that is coupled to a first connecting rod (25), and a second pivot arm (22B) that is coupled to a common pivot point (30). Similarly, the second piston (35) further comprises a first pivot arm (37A) that is coupled to a second connecting rod (40), and a second pivot arm (37B) that is coupled to the common pivot point (30). The second pivot arms (22B, 37B) of each piston (20, 35) extend in a radial direction towards the center of the engine. In one form of the present disclosure, the first connecting rod (25) is coupled to the first piston arm (22A) of the first piston (20) at a first junction comprising a first junction axis (100A) and the second connecting rod (40) is coupled to the second pivot arm (37A) of the second piston (35) at a second junction comprising a second junction axis (100C). The first pivot arm (22A) and the second pivot arm (22B) are coupled at the common pivot point (30) comprising a common pivot axis (100B). The first junction axis (100A), the second junction axis (100C), and the common pivot axis (100B) are parallel to each other when aligned in a common plane.

A first crankshaft (45) is coupled to the first connecting rod (25), while a second crankshaft (50) is coupled to the second connecting rod (40). The first crankshaft (45) and the second crankshaft (50) are located outside the cured path of the first piston (20) and second piston (35) as defined by the common pivot point (30) and the first (10) and second (15) walls that delimit the first (11) and second (16) combustion chambers, respectfully. The connecting rods (25, 40) may be coupled to the crankshafts (45, 50) using any means known to one skilled in the art of engines including but not limited to bearings and bolts.

Each crankshaft (45, 50) may be coupled to a flywheel (75), e.g., via transmission wheels. The crankshafts (45, 50) may also be coupled to the flywheel (75) by any means known to one skilled in the art, including but not limited to using chains or toothed belts. The first (45) and second (50) crankshafts may rotate in the opposite direction. When the first crankshaft (45) and second (50) crankshafts rotate in the opposite direction, the coupling to additional flywheels (76) is simplified because they can be directly interposed between the crankshafts as illustrated in FIG. 2.

In one form of the present disclosure, the first crankshaft (45) comprises a first rotary axis (102A) and the second crankshaft (50) comprises a second rotary axis (102C). The first rotary axis (102A) and the first junction axis (100A) described above are parallel to each other and aligned within a first plane (103A); while the second rotary axis (102C) and second junction axis (100C) are parallel to each other and aligned within a second plane (103C). The mid-center position of the first piston (20), the second piston (35), the first plane (103A), and the second plane (103C) are perpendicular to the common plane (101) described above with respect to the alignment of the first junction axis (100A), the second junction axis (100C), and the common pivot axis (100B).

The first (10) and second (15) walls that delimit the first (11) and second (16) combustion chambers, respectively, may be constructed as a single component or as multiple components. In one form of the present disclosure, the first (10) and second (15) walls are constructed as two components (Right & Left) that are fastened together. Such fastening may be accomplished by any means known to one skilled in the art of engines, including but not limited to the use of bolts and adhesives. The use of gaskets and seals may be used to reduce the possible occurrence of any leaks that could develop between the fastened components (R & L) that comprise the walls.

As shown in FIG. 3, the first (10) and second (15) walls may further comprise cooling channels (17). These cooling channels (17) may utilize the flow of a gas, such as air, or the flow of a liquid, such as water or oil, to provide a cooling effect to the combustion chambers (11, 16), piston heads (21, 36), and pistons (20, 35). Such a cooling effect is attributed to the thermal transfer of heat away from the walls to the flowing liquid or gas in the cooling channels (17).

The engine (1) may further comprise an intake port (62), an exhaust port (63), a cylinder pressure mount (60), and a spark or glow plug (61) in at least one of the first (10) and second (15) walls. A double spark ignition system may be provided. Typically, the intake port (62) and exhaust port (63) intersect with a combustion chamber (11, 16) in at least one of the first (10) and second (15) walls. In addition, a fuel injector port is provided to intersect with at least one of the combustion chambers (11, 16). The angle of intersection between the intake (62) port, exhaust (63) port, and injector port (55) with the combustion chamber (11, 16) is about 90 degrees. During the normal scavenging process of the two cycle embodiment the exhaust port (63) is preferably opened for a longer period of time than the intake port (62).

Figure 6A:
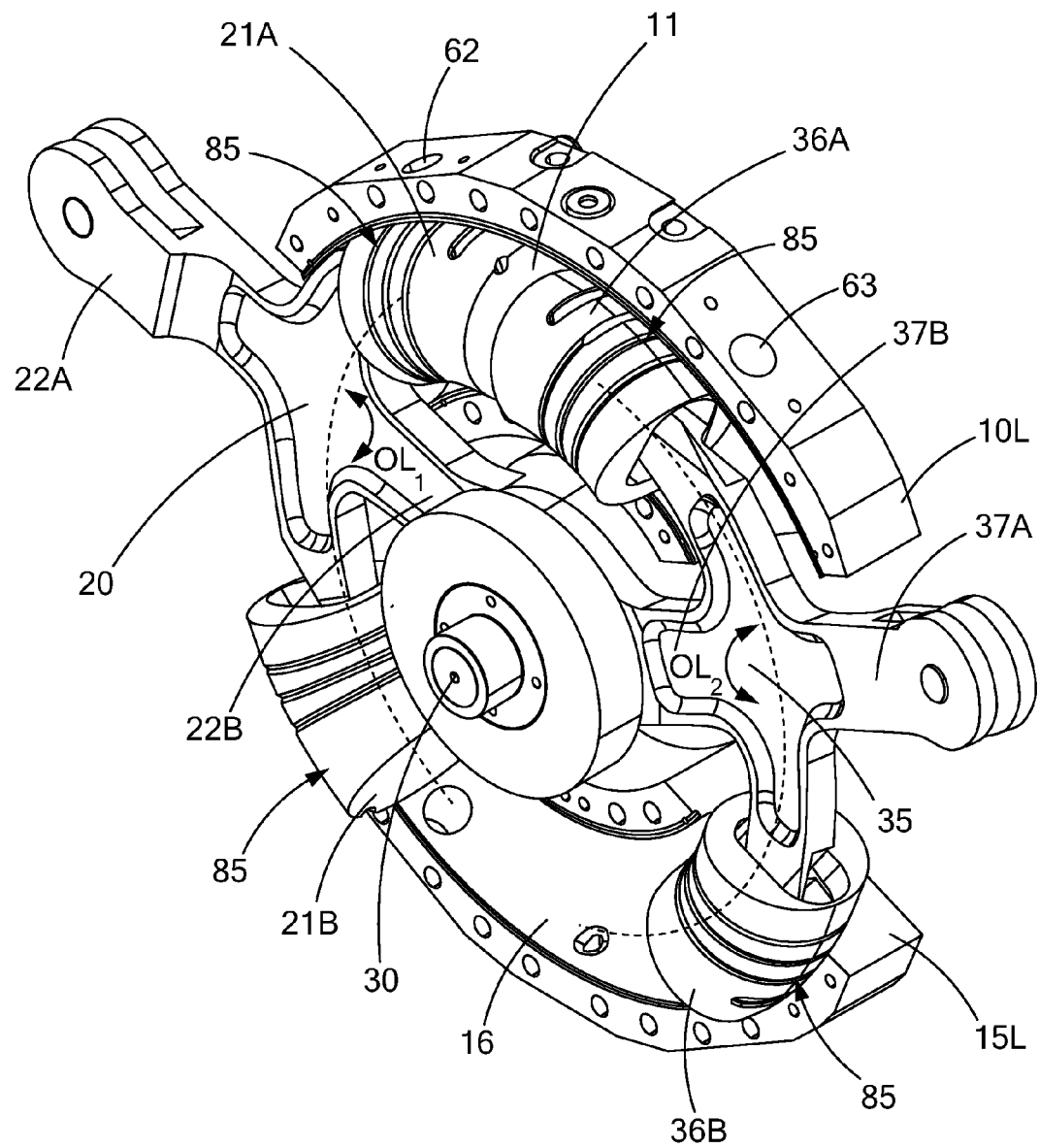
FIG. 6A is a perspective view of one form of the present disclosure illustrating combustion chambers and pistons used in the internal combustion engine of FIGS. 1-5 with pistons rotated in their upper position.
Figure 6B:
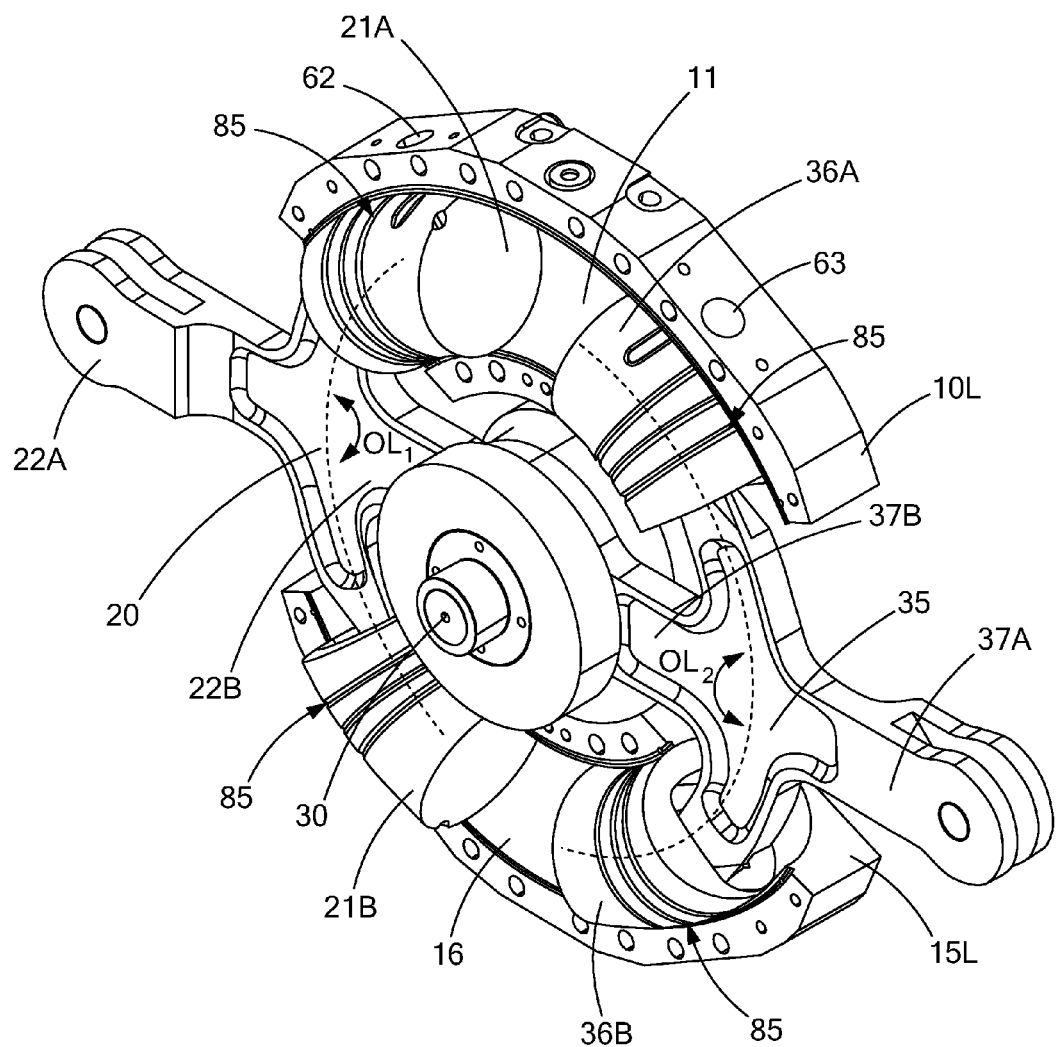
FIG. 6B is a perspective view of one form of the present disclosure illustrating combustion chambers and pistons used in the internal combustion engine of FIGS. 1-5 with pistons rotated into a middle position.

Referring now to FIG. 4, the first combustion chamber (11) is further delimited by a first piston head (21A) of a first piston (20). The second combustion chamber (16) is further delimited by a second piston head (21B) of the first piston (20). The first combustion chamber (11) is still further delimited by the first piston head (36A) of a second piston (35); while the second combustion chamber (16) is still further delimited by a second piston head (36B) of the second piston (35). In one form of the present disclosure as illustrated in FIG. 6B, the first piston head (21A) and the second piston head (21B) of the first piston (20) make an angle (a1) with each other, while the first piston head (36A) and the second piston head (36B) of the second piston (35) make an angle ($\alpha$2). Angles ($\alpha$1) and ($\alpha$2) are preferably at least 110 degrees. The piston heads (21, 36) may include piston rings (85), which seal the piston heads with respect to the walls (10, 15) of the engine housing (5).

The first piston (20), the second piston (35), the piston heads (21, 36), the first wall (10), or the second wall (15) may be comprised of a metal, a carbon composite, or a ceramic composite among others. The piston heads (21, 36) may be made of graphite composite. The pistons (20, 35) and piston heads (21, 36) may be either completely solid or partially hollow depending upon the application. Examples of metals may include but are not limited to aluminum and heat treated steel. Examples of ceramic composites may include silicon carbide or silicon nitride, among others. The strength of carbon and ceramic composites may be enhanced through the use of fiber reinforcement.

Figure 6C:
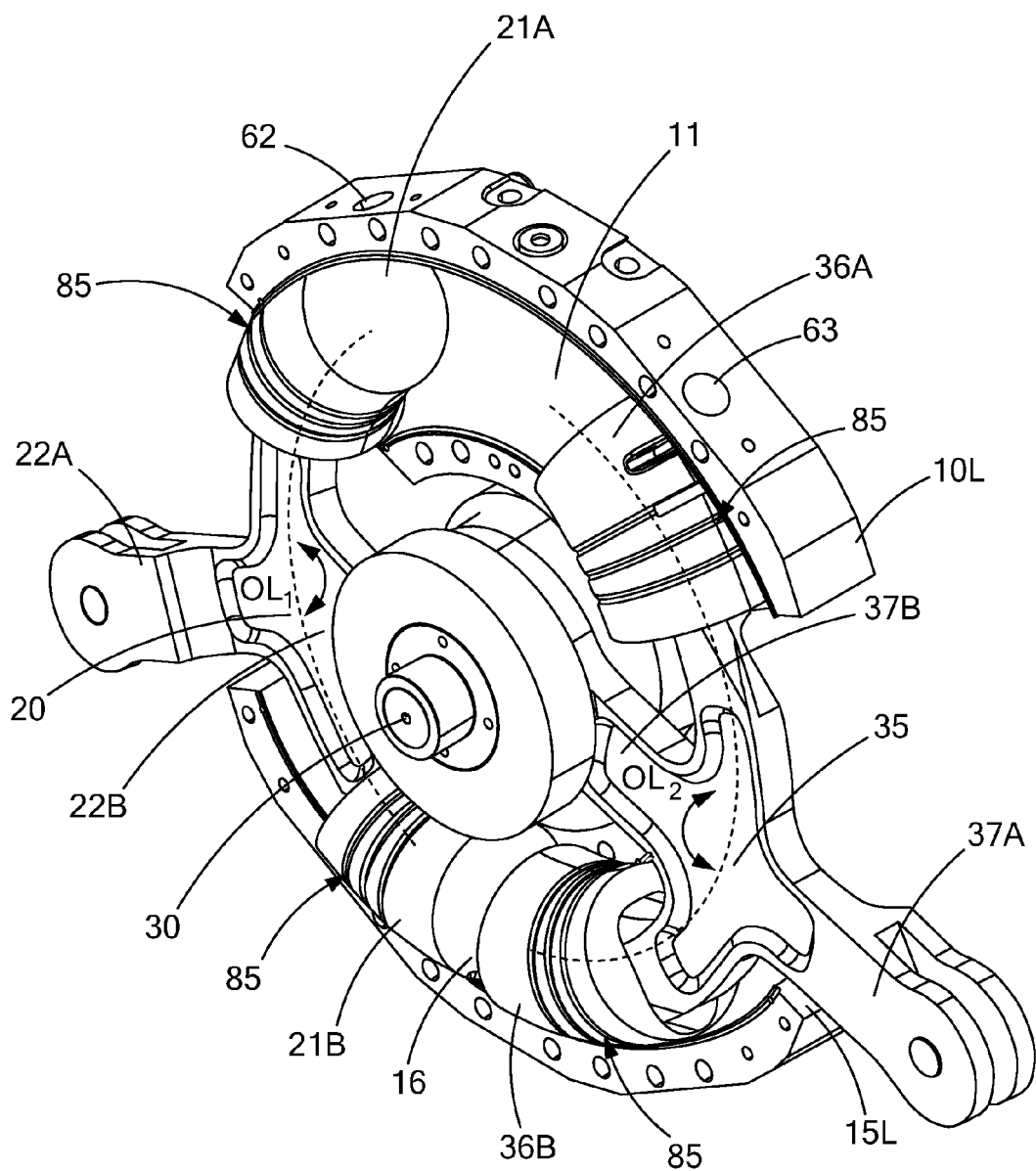
FIG. 6C is a perspective view of one form of the present disclosure illustrating combustion chambers and pistons used in the internal combustion engine of FIGS. 1-5 with pistons rotated in their lower position.

The shape of the combustion chamber (11, 16) as defined by the piston heads (21, 36) and walls (10, 15) may be any shape known to one skilled in the art of engine combustion, including but not limited to a cone or cylindrical shape. The motion of the pistons (20, 35) in the engine (1) of the present disclosure is illustrated sequentially in FIGS. 6A-6C. In FIG. 6A, the pistons (20, 35) are rotated into an upper position, whereby, the piston heads (21A, 36A) reduce the volume of combustion chamber (11), while the piston heads (21B, 36B) increase the volume of combustion chamber (16). When the pistons (20, 35) are rotated into a middle position (see FIG. 6B), the volume of the combustion chambers (11, 16) are similar. In FIG. 6C, the pistons (20, 35) are rotated into a lower position, whereby, the piston heads (21B, 36B) reduce the volume of combustion chamber (16), while the piston heads (21A, 36A) increase the volume of combustion chamber (11).

Figure 7:
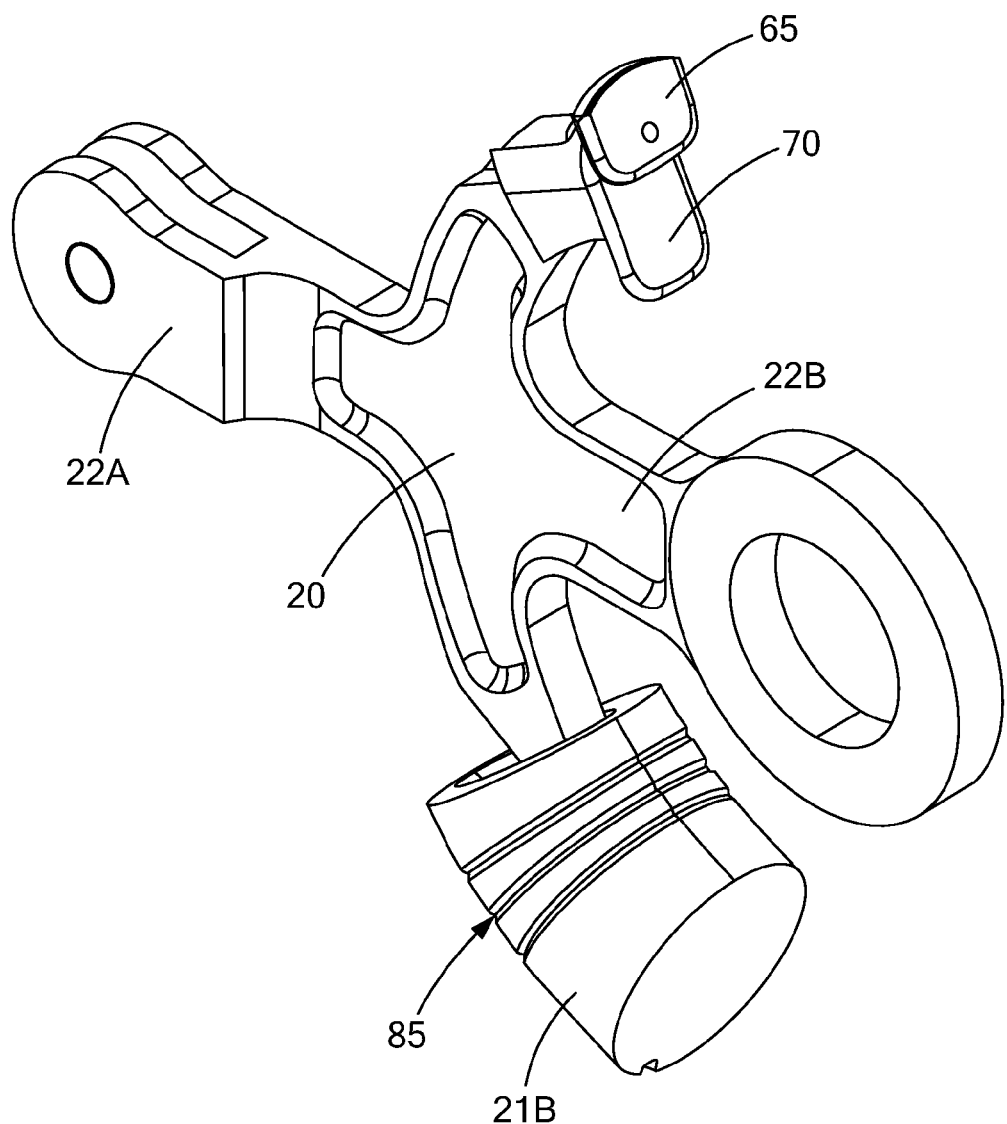
FIG. 7 is a perspective view of another form of the present disclosure illustrating components of a piston used in the internal combustion engine of FIG. 6.
Figure 8:
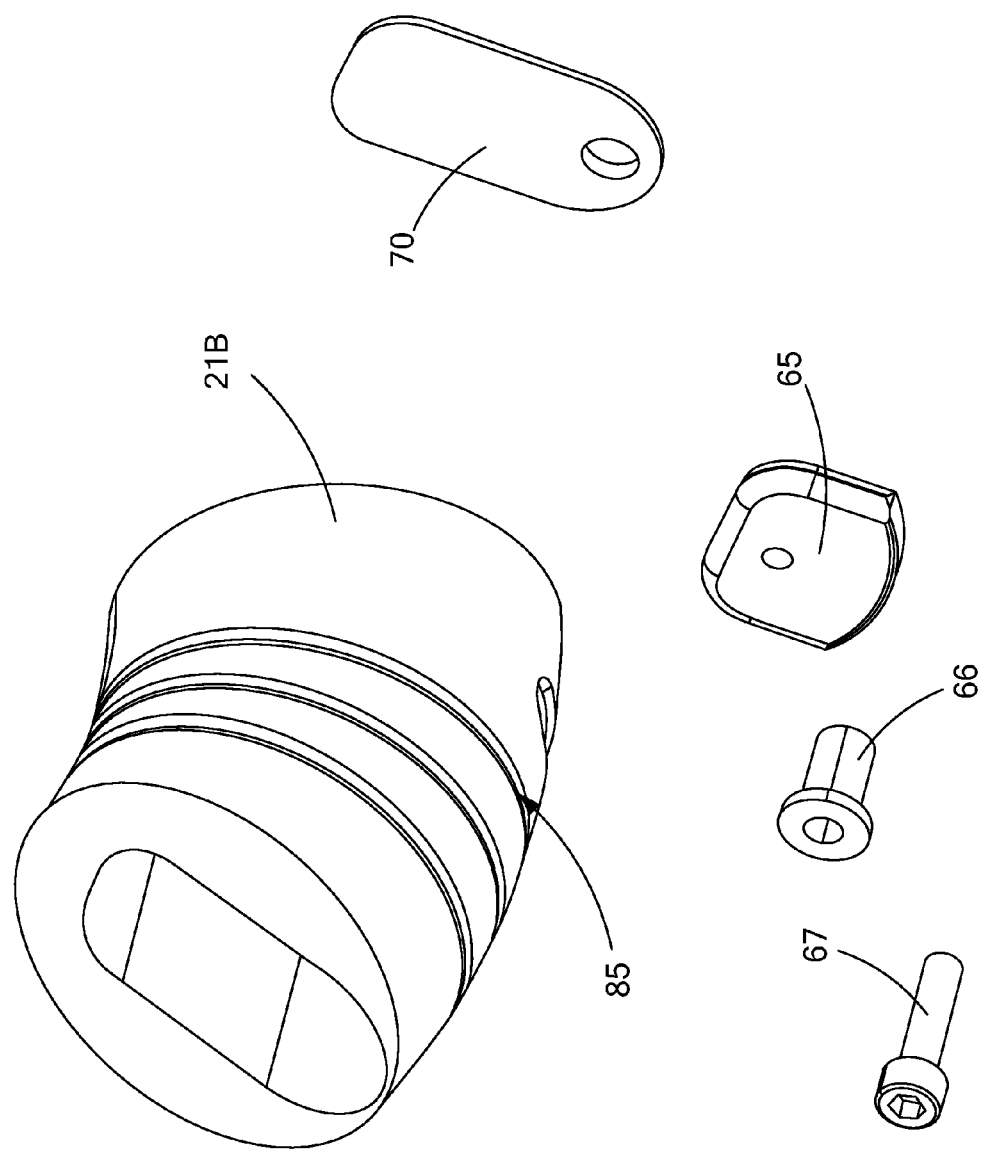
FIG. 8 is an exploded view of the components found in conjunction with a piston used in the internal combustion engine of FIG. 7.

Referring now to FIGS. 7-8, a combination of piston plates (65) and primary member plates (70) are used to couple each piston head (21, 36) to the corresponding piston (20, 35). Although only one set of piston plates (65) and primary member plates (70) are illustrated in the Figures, anyone skilled in the art would realize that such a combination of plates (65, 70) can be utilized for each piston head (21, 36). The combination of plates (65, 70) may be fastened to the piston heads (21, 36) using various types of bolts and connectors (66, 67). The purpose of these plates (65, 70) are to more evenly transfer and distribute from pistons (20, 35) to the corresponding piston heads (21, 36), the forces that occur during the operation of the motor. The transfer of these forces is done over the broad connection area of the plate combination (65, 70) to the pistons (20, 35) in order to reduce stresses and the risk of potential failure, e.g., formation of stress cracks, near such connections.

Figure 9A:
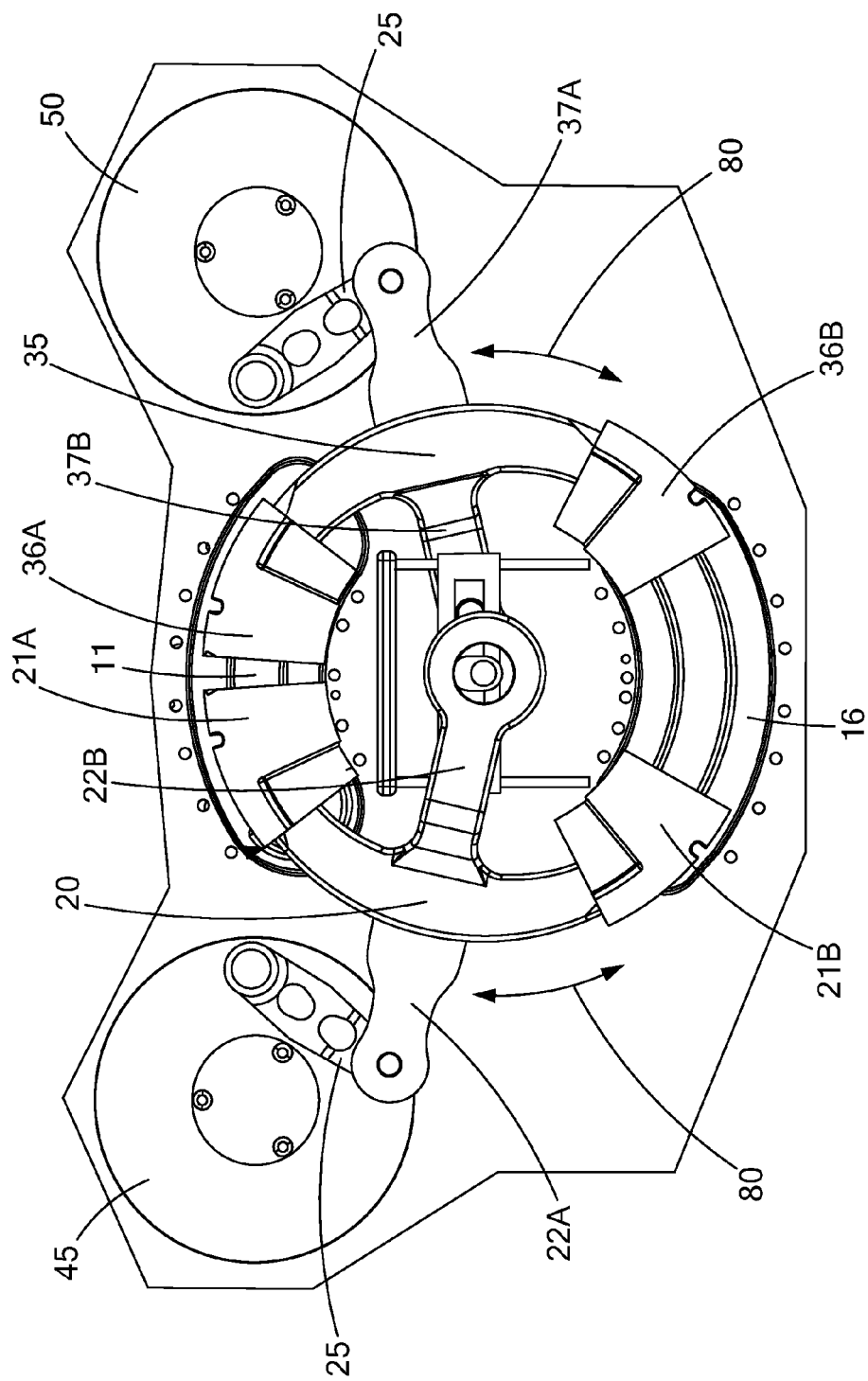
FIG. 9A is a perspective view of another form of an internal combustion engine in accordance with the present disclosure illustrating the motion of the pistons used in the internal combustion engine of FIG. 1.
Figure 9B:
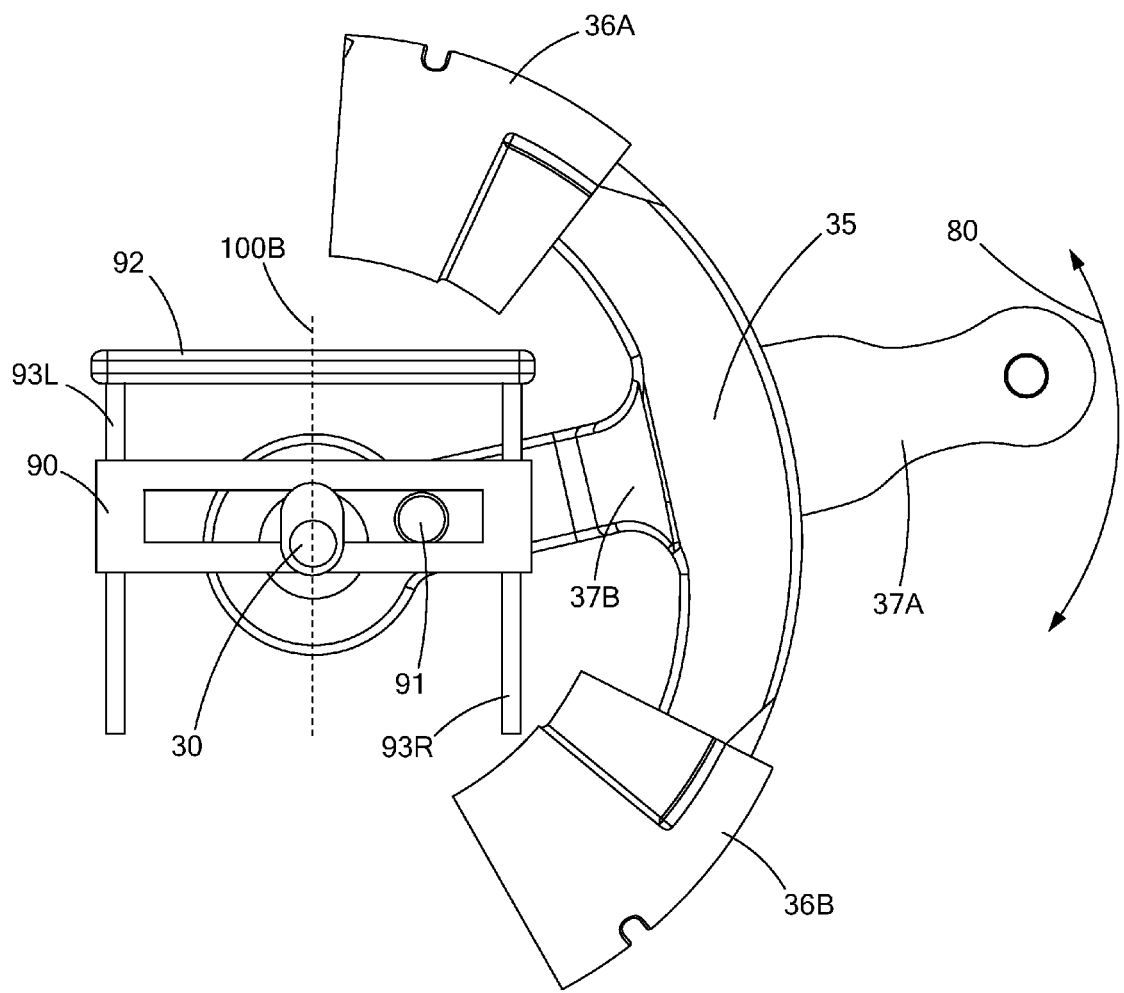
FIG. 9B is a perspective view of another form of an internal combustion engine in accordance with the present disclosure and further illustrating a mechanism used to move pistons.

Referring now to FIGS. 9A and 9B, another form of a rotary internal combustion engine is illustrated having the first (20) and second (35) pistons guided along a curved path defined by the common pivot point (30). Such a curved path is depicted in FIGS. 9A and 9B by the arrows (80). The first pivot arms (22A, 37A) are coupled to crankshafts (45, 50) that are located outside the torus established by the pistons (20, 35). FIGS. 9A and 9B is intended to describe the movement or motion of the pistons and the interaction of the second pivot arms (22B, 37B) of each piston (20, 35) with the common pivot point (30). The second pivot arm (22B) of the first (20) piston and the second pivot arm (37B) of the second (35) piston oscillate about a common pivot point (30). The first (20) and second (35) pistons move simultaneously in opposite directions, thereby causing the piston heads (21, 36) to either expand or reduce the volume of the corresponding combustion chambers (11, 16). In FIG. 9A, the pistons (20, 35) are both rotated into their top position, thereby, reducing the volume of the first combustion chamber (11) and increasing the volume of the second combustion chamber (16). When the pistons (20, 35) move from their top position to bottom position, the volume of the first combustion chamber (11) will then become larger, while the volume of the second combustion chamber (16) becomes smaller.

In FIG. 9B, the movement of a piston (35) according to the curved path (80) defined by the crankshaft coupled through pivot arms (37A, 37B) to the common pivot point (30) comprising a common pivot axis (100B) is depicted. The other piston (20) is envisioned to move in a substantially similar fashion. The second pivot arm (37B) is coupled to a guide frame (90) via an engaging member (91). The guide frame (90) is arranged so that it is substantially parallel with the second pivot arm (37B). This guide frame (90) has an open receiving area in which the engaging member (91) and the common pivot point (30) are disposed. The guide frame (90) is integrated with a guiding means (92) that includes two parallel guide columns (93R, 93L). The guide frame (90) is allowed to move in the direction set forth by the guide columns (93). The motion of the guide frame (90) along the guide columns (93) is transferred to the piston (35) due to the connection of the second pivot arm (37B) to the guide frame (90) via the engaging member (91). When the guide frame (90) moves along the guide posts (93) in a upward direction, the pistons (20, 35) travel along a circular path resulting in minimizing the volume of combustion chamber (11) and maximizing the volume of combustion chamber (16) as shown in FIG. 4A. The movement of the pistons is further described in U.S. Pat. No. 7,600,490 (filed on May 30, 2006), which is commonly owned with the present application, the contents of which are hereby incorporated by reference.

Figure 10A:
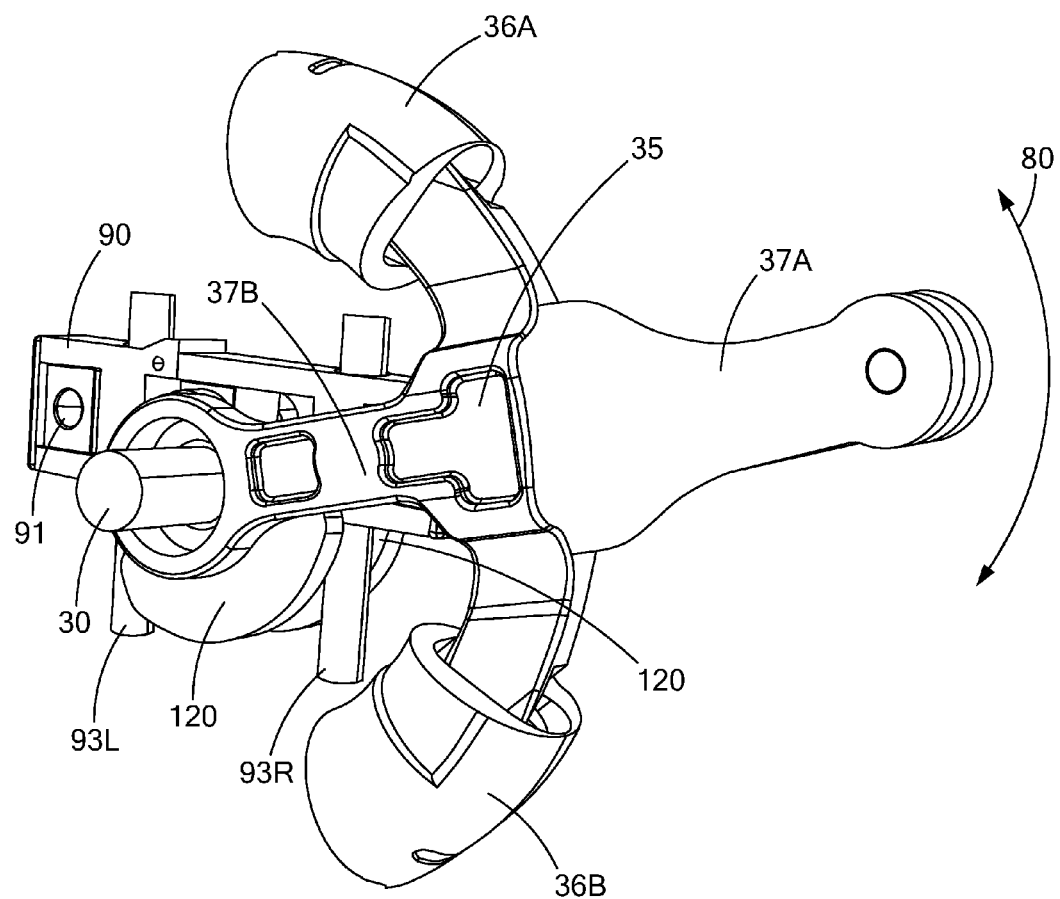
FIG. 10A is a perspective view of another form of an internal combustion engine in accordance with the present disclosure illustrating another mechanism used to move pistons.
Figure 10B:
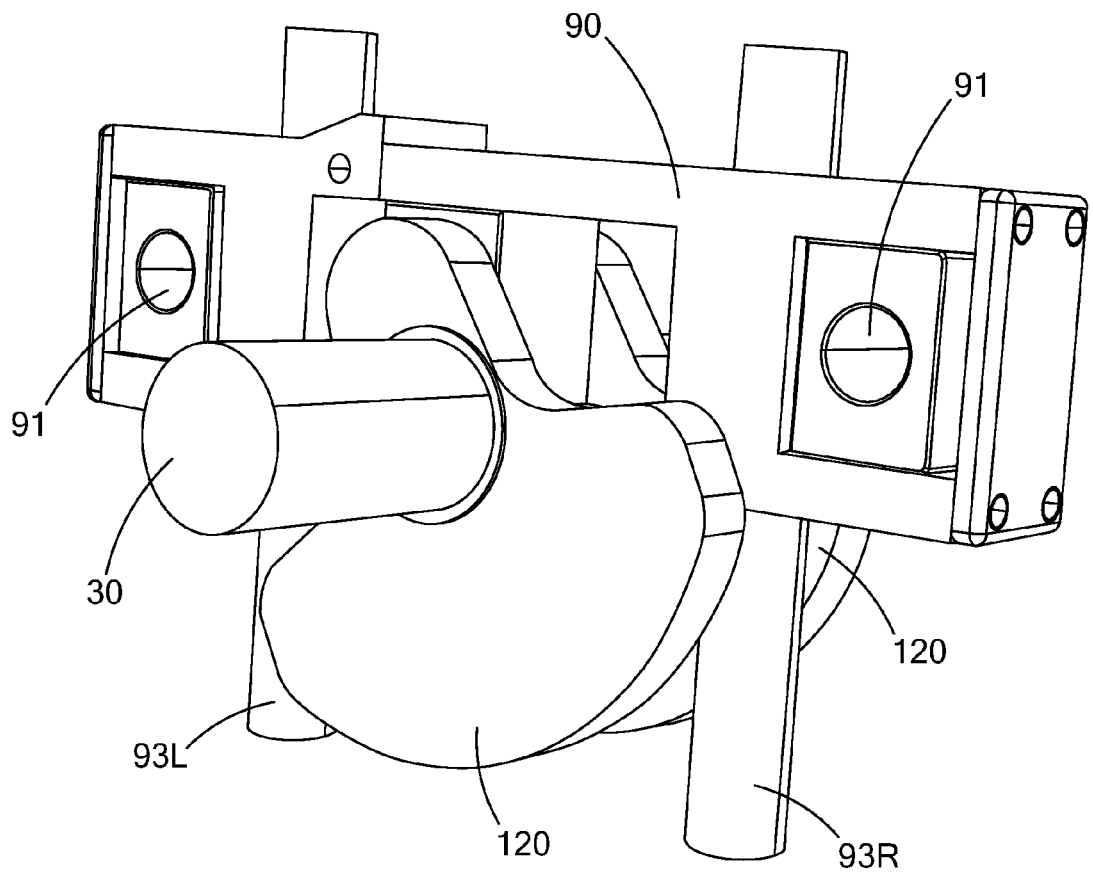
FIG. 10B is a perspective view of the mechanism used to move pistons in the internal combustion engine of FIG. 10A.

Referring now to FIG. 10A, another embodiment according to the present disclosure for the movement of a piston (35) and its associated piston heads (36A, 36B) along curved path (80) is depicted. In this embodiment, the guide frame (90) is coupled to the common pivot point (30), as well as the second pivot arm (37B) via an engaging member (91). At least one oblong plate (120) is coupled with the common pivot point (30). Preferably one oblong plate (120) is located on each side of the guide frame (90) as shown in FIG. 10B. As the oblong plate (120) is rotated about the common pivot point (30) and the guide frame (90) moves along the guide posts (93) in an upward or downward direction, the momentum generated by the movement of the oblong plate (120) is able to maintains the oscillating movement of the piston (35) along the curved path (80).

Although the various embodiments for a rotary combustion engine as shown in the present disclosure have depicted the crankshafts (45, 50) to be outside the diameter of the toroidal path of the pistons (20, 35), one skilled in the art will recognize that the crankshafts could be positioned inside the diameter of the piston's toroidal path. One example of an embodiment of the present disclosure with a crankshaft positioned inside the diameter of the pistons' toroidal path is provided in FIGS. 11A and 11B. When the crankshaft is provided in this manner, the first and second pistons (20, 35) comprise piston arms (22B, 37B) connected to a common pivot point (30) having a crank pin (150) through which coupling to the flywheel (not shown) can be accomplished.

Figure 11A:
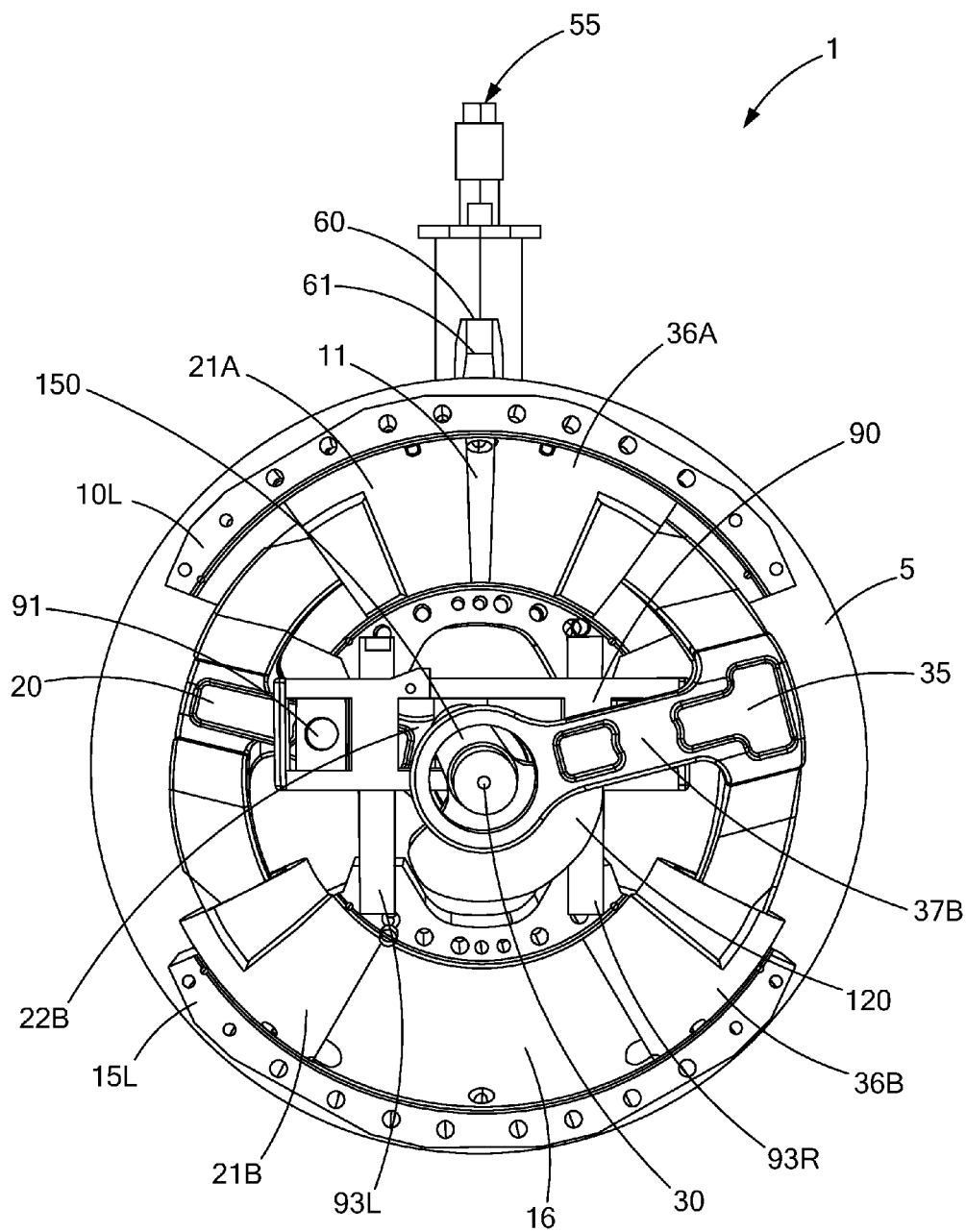
FIG. 11A is a perspective view of another form of an internal combustion engine in accordance with the present disclosure illustrating coupling to a crankshaft inside the diameter of the toroidal path of the pistons.
Figure 11B:
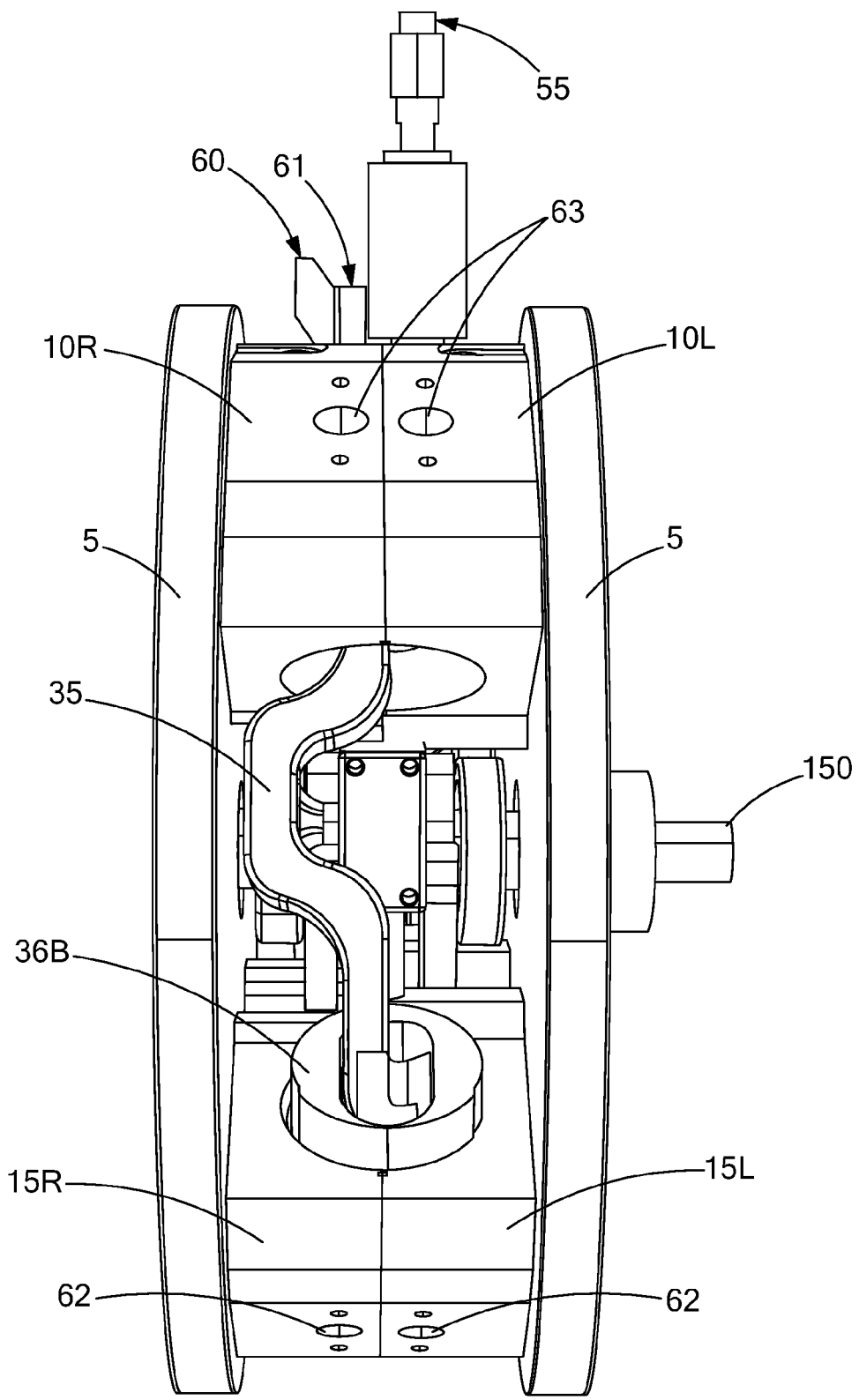
FIG. 11B is side view of the internal combustion engine of FIG. 11A.

In FIGS. 11A and 11B, an internal combustion engine (1) is provided having an engine housing (5, partially shown) with a first wall (10) that delimits a first combustion chamber (11) and a second wall (15) that delimits a second combustion chamber (16) with the first (10) and second (15) walls each defining at least a section of a torus The combustion chambers (11, 16) are further delimited by a first piston (20) and a second piston (35) with each piston having a torus shape and two piston heads (21, 36). The ends of the walls (10, 15) that delimit the combustion chambers (11, 16) further act as guides for the piston heads (21, 36) located at the ends of the pistons (20, 35). The first (20) and second (35) pistons move simultaneously in opposite directions, thereby causing the piston heads (21, 36) to either expand or reduce the volume of the corresponding combustion chambers (11, 16). In one embodiment, the movement of the pistons (20, 35) may use the mechanism depicted in FIG. 10 having a guide frame (90) coupled to a common pivot point (30) having a crank pin (150) along with at least one oblong plate (120) that can sustain the oscillatory motion of the pistons (20, 35). The engine (1) may further comprise an intake port (62), an exhaust port (63), a glow plug (61), and a cylinder pressure mount (60) in at least one of the first (10) and second (15) walls and that intersects with a combustion chamber (11, 16).

A person skilled in the art will recognize from the previous description that further modifications and changes can be made to the present disclosure without departing from the scope of the disclosure as defined in the following claims.

What is claimed is:

1. An internal combustion engine, the engine comprising:
an engine housing having a first wall delimiting a first combustion chamber and a second wall delimiting a second combustion chamber with the first and second walls each defining at least a section of a torus;
a first piston having a first piston head further delimiting said first combustion chamber, a second piston head further delimiting said second combustion chamber, a first pivot arm coupled to a first connecting rod, and a second pivot arm coupled to a common pivot point;
a second piston having a third piston head further delimiting said first combustion chamber, a fourth piston head further delimiting said second combustion chamber, a third pivot arm coupled to a second connecting rod, and a fourth pivot arm coupled to said common pivot point;
a first crankshaft coupled to said first connecting rod, and a second crankshaft coupled to said second connecting rod;
wherein said first and second pistons are guided along a curved path defined by said common pivot point;
wherein said first and second pistons move in opposite directions;
wherein said second pivot arm of said first piston and said fourth pivot arm of said second piston oscillate about said common pivot point;
wherein said first crankshaft and said second crankshaft are located outside the curved path of said first piston and said second piston as defined by said common pivot point; and
wherein said common pivot point further comprises:
a guide frame having an open receiving area in which an engaging member couples the guide frame to either the second pivot arm or the fourth pivot arm; and
a guiding means that includes two parallel guide columns;
wherein the motion of the guide frame along the guide columns is transferred to a piston.

2. The combustion engine of claim 1, wherein said first and second pistons move simultaneously.

3. The combustion engine of claim 1, wherein at least one of said first wall and said second wall are comprised of a right component and a left component coupled together.

4. The combustion engine of claim 1, wherein said first and said second walls further comprise cooling channels.

5. The combustion engine of claim 4, wherein said cooling channels use either air or a liquid to provide cooling by a thermal heat transfer mechanism.

6. The combustion engine of claim 1, wherein said engine further comprises at least one of an intake port, an exhaust port, a fuel injector port, and a spark plug disposed in at least one of said first and second walls.

7. The combustion engine of claim 6, wherein said intake port intersects with a combustion chamber in at least one of said first and second walls at an angle of about 90 degrees.

8. The combustion engine of claim 6, wherein said exhaust port is open for a longer period of time than said intake port.

9. The combustion engine of claim 1, wherein said common pivot point further comprises:
   at least one oblong plate;
   wherein the momentum generated by the movement of the oblong plate maintains the oscillating movement of the piston.

10. The combustion engine of claim 1, wherein at least one of said first piston, said second piston, said first piston head, said second piston head, said third piston head, said fourth piston head, said first wall or said second wall are comprised of one selected from the group of aluminum, steel, a carbon composite, or a ceramic composite.

11. The combustion engine of claim 10, wherein the carbon or ceramic composite is fiber reinforced.

12. The combustion engine of claim 1, wherein a combination of piston plates and primary member plates are used to couple the first, second, third, and fourth piston heads to the corresponding first and second pistons.

13. The combustion engine of claim 1, wherein the engine is one of a two-cycle engine, a four-cycle engine, an Otto engine, and a diesel engine.

14. The combustion engine of claim 1, wherein the angle ($\alpha_1$, $\alpha_2$) between the first piston head and the second piston head of each piston is at least 110 degrees.

15. The combustion engine of claim 1, wherein said first connecting rod is coupled to said first piston arm of said first piston at a first junction comprising a first junction axis and said second connecting rod is coupled to said fourth pivot arm of said second piston at a second junction comprising a second junction axis; wherein said first junction axis, said second junction axis, and said common pivot axis each being parallel to each other when aligned in a common plane.

16. The combustion engine of claim 1, wherein said first crankshaft and second crankshaft are coupled to a flywheel.

17. The combustion engine of claim 16, wherein said first crankshaft and second crankshaft rotate in the same direction.

* * * * *